United States Patent [19]

Ljudmirsky

[11] 4,295,103

[45] Oct. 13, 1981

[54] METAL VAPOR LASER

[76] Inventor: Ariold Ljudmirsky, 8L/26 Ramot, Jerusalem, Israel

[21] Appl. No.: 889,396

[22] Filed: Mar. 23, 1978

[51] Int. Cl.³ .............................................. H01S 3/097
[52] U.S. Cl. ........................ 331/94.5 PE; 331/94.5 D; 331/94.5 G
[58] Field of Search ................... 331/94.5 G, 94.5 PE, 331/94.5 D

[56] References Cited

U.S. PATENT DOCUMENTS

| | | | |
|---|---|---|---|
| 3,393,372 | 7/1968 | Vickery et al. | 331/94.5 G |
| 3,493,845 | 2/1970 | Bramley | 331/94.5 P |
| 3,509,490 | 4/1970 | Zarowin | 331/94.5 PE |
| 3,521,119 | 7/1970 | Ahmed et al. | 331/94.5 PE |
| 3,585,524 | 6/1971 | Silfvast | 331/94.5 G |
| 3,597,700 | 8/1971 | Rouy | 331/94.5 G |
| 3,639,804 | 2/1972 | Hernqvist | 331/94.5 PE |
| 3,891,941 | 6/1975 | Roberts et al. | 331/94.5 G |
| 3,986,139 | 10/1976 | Meneely | 331/94.5 G |

Primary Examiner—James W. Davie
Attorney, Agent, or Firm—Karl F. Ross

[57] ABSTRACT

Coherent light is emitted from a laser which comprises a cylindrical tube of dielectrical material surrounded at axially spaced locations by looped inductors extending over the major part of its circumference connected across a pulse generator, e.g. through a coaxial-cable transformer. The pulses may be used to vaporize annular metallic bodies within the tube, respectively aligned with these inductors, in order to generate metal vapors which are then excited by other pulses that are either transmitted axially through the tube across a pair of end electrodes or applied to other inductors surrounding the tube at locations between the vaporizing inductors. The tube may also be filled with a buffer gas, in which case the metallic bodies may be divided into arcuate sections separated by small gaps giving rise to arcing. Alternatively, the first-mentioned inductors may be used to excite only a gas, without metal-vapor generation. Vaporization may also be carried out with the aid of a transverse magnetic field generated by an external inductor in the form of a coil lying flat against a wall of a prismatic tube lines internally with the metallic source material.

33 Claims, 8 Drawing Figures

METAL VAPOR LASER

FIELD OF THE INVENTION

My present invention relates to lasers in general and more particularly although not exclusively to metal-vapour lasers. It is also concerned with methods of stimulating coherent radiation and with particular steps in laser operation.

BACKGROUND OF THE INVENTION

As is well known, lasers are devices in which a material is stimulated in an optical cavity to produce amplified coherent light, normally in the form of a beam. The art is now sophisticated and various types of lasers are known, of which the following types are of interest in connection with the present invention, namely metal-vapor lasers, gas lasers and chemical-vapour lasers (including ionic and atomic lasers). In all such types of laser the source either is in the form of a gas or vapor or is brought to such a form before excitation. Metal-vapour lasers are of particular interest in that they afford a high theoretical efficiency, in terms of energy used for excitation and luminous output energy.

The energy levels involved in a laser are illustrated in FIG. 1. Particles at a ground energy level are exited to a resonant energy level and fall to a metastable level emitting coherent light. The efficiency of radiation is given by the formula $$\eta \approx K \frac{E_r - E_m}{E_r} \cdot \frac{g_m}{g_m + g_r} \; ;$$

where r and m are indexes corresponding to the resonant and metastable levels,
E and g correspond to Energy and Statistical Weight levels, and
K is the transfer coefficient of energy from the excitation means.

The theoretical energy efficiency (which ignores the transfer coefficient K) can be calculated from the energy levels of the atomic configurations of the source material. Where the metastable level is high in relation to the ground and resonant energy levels, there is a relatively low theoretical efficiency. The theoretical efficiency increases as the metastable level approaches ground level, as shown in FIG. 1 in broken lines. The interest in metal-vapor lasers lies in the fact that in many metals there is a relatively low metastable energy level which can give rise to a high theoretical efficiency. This can lie between 20% and 80% depending on the particular metal concerned.

However, metal-vapour lasers are subject to the great difficulty of production of the vaporized metal. Normally this involves very high temperatures and this is especially the case with certain metals which have a high laser efficiency. Normally the metal is heated in an oven, which may involve inserting the whole or certain parts of the laser in the oven, with consequent disadvantages, or, more recently by repeated discharges. This is the method employed e.g. in Anderson et al [1] (see Schedule of References). Apart from practical difficulties, there are theoretical problems in that where high temperatures are used, population inversion becomes difficult if not impossible in the case of metals having low-energy, metastable levels on account of the high inherent polulation in the metastable energy level.

Another type of metal-vapor laser utilizes exploding wires (see for example Rice et al [2]. The disadvantage here is that the laser can only be used once. Yet another method involves a discharge between electrodes to strip a deposited metal off the tube wall (see Shukhtin et al [3]. This suffers from the drawback attendant also upon the other methods that it is necessary to utilize conductor wires passing through the tube, which is expensive and may lead to the introduction of impurities. Furthermore, the metal-vapor fills the whole tube which may not always be desirable. It can lead for example to deposition of the metal on the beam-exit glass.

It is also generally very difficult to create a high atomic (or ionic) vapor density by reason of the high vaporization temperatures of most metals. Furthermore, quick vaporization is normally possible to achieve.

In particular it has not hitherto been possible to obtain a laser utilizing the 4511.32 Å transition of indium, whose theoretical efficiency is over 80%.

OBJECT OF THE INVENTION

The object of my present invention is to overcome the drawbacks in metal-vapor lasers as well as other lasers of the types above mentioned.

SUMMARY OF THE INVENTION

In accordance with one aspect of the invention, an electrically conductive lasing substance to be vaporized in solid form in a laser is generated in a microplasma by an electric current passed between closely positioned but discrete surfaces of one or more bodies of the metal within the laser vessel.

The vapor may be generated at a plurality of locations within the dielectric laser vessel, either substantially at the site of its excitation or at a predetermined distance from such site. I prefer to let vapor generation take place at several sites distributed along a beam axis of the laser at predetermined distances from respective excitation sites. The vessel may be tubular and the solid mass may be in the form of a discontinuous cylinder lying against or close to the inner wall of the vessel. The metallic body or bodies may be energized by an inductor outside the laser, pursuant to another aspect of the invention.

The annular sections of the aforementioned discontinuous cylinder may be slitted by one or more generally transverse gaps, preferably oblique, while being self-supporting within the tubular vessel. The source may also alternatively comprise a porous inert support in whose interstices particles of the vaporizable solid are deposited.

In the preferred laser, excitation of the metal vapor is carried out through a glow discharge produced in a buffer gas, advantageously by causing breakdown of the gas by inducing therein a rapidly changing electromagnetic field from an inductor outside the laser vessel.

Again the excitation may take place at sites which are distributed along a beam axis of the laser at predetermined distances from respective vaporization sites, e.g. where metal vaporization is utilised. However, the method has a general application also in gas lasers and chemical lasers.

Thus, with the preferred mode of realization of the invention the conditions for producing the breakdown in the gas with the aid of an induced electromagnetic field resemble those for producing the $\theta$ pinch effect in plasma technology.

In, for example, a metal-vapor laser conforming to this preferred mode of realization I generate excitation pulses at successive sites along a light-beam axis, with successive delays determined by the speed of propagation of light between the sites. In this way, super-radiation may be produced with preferential light transmittance in one direction [6]. No reflecting surfaces are necessarily needed, except for possibly only a single such surface opposite the beam outlet.

Preferably, one or more excitation pulses are produced at predetermined intervals from respective vaporisation pulses. Each excitation pulse is advantageously timed to occur after quenching of the particles at metastable energy levels.

The above and other features of my invention will now be described with reference to the accompanying drawing, in which.

Figure 1:
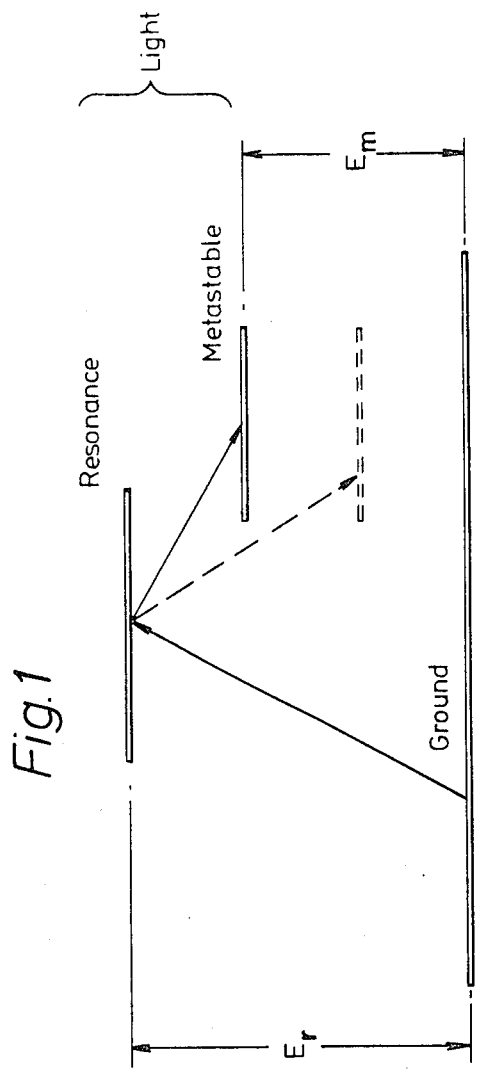
FIG. 1 is a diagram showing the energy levels of atoms involved in laser-beam generation.

FIG. 1 has already been discussed above.

SPECIFIC DESCRIPTION

Figure 3:
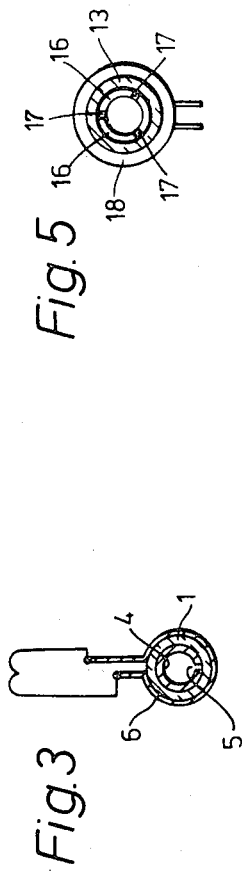
FIG. 3 is a transverse cross-section along the line III—III of FIG. 2.
Figure 2:
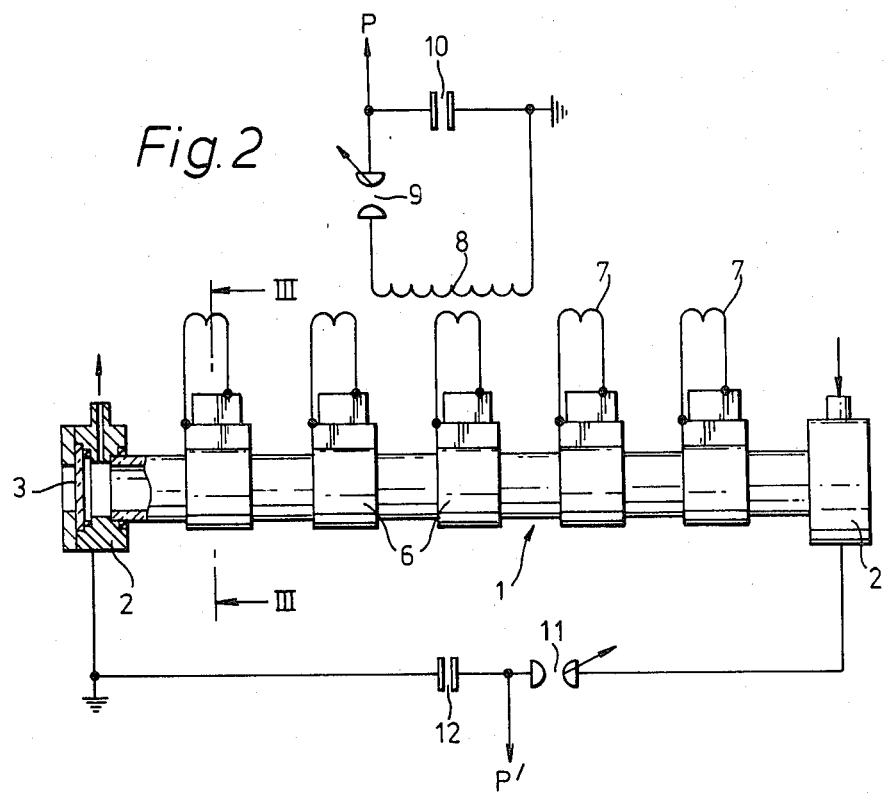
FIG. 2 is a schematic side view of a laser constructed in accordance with the invention, the extreme left-hand part being shown in axial cross-section.
Figure 6:
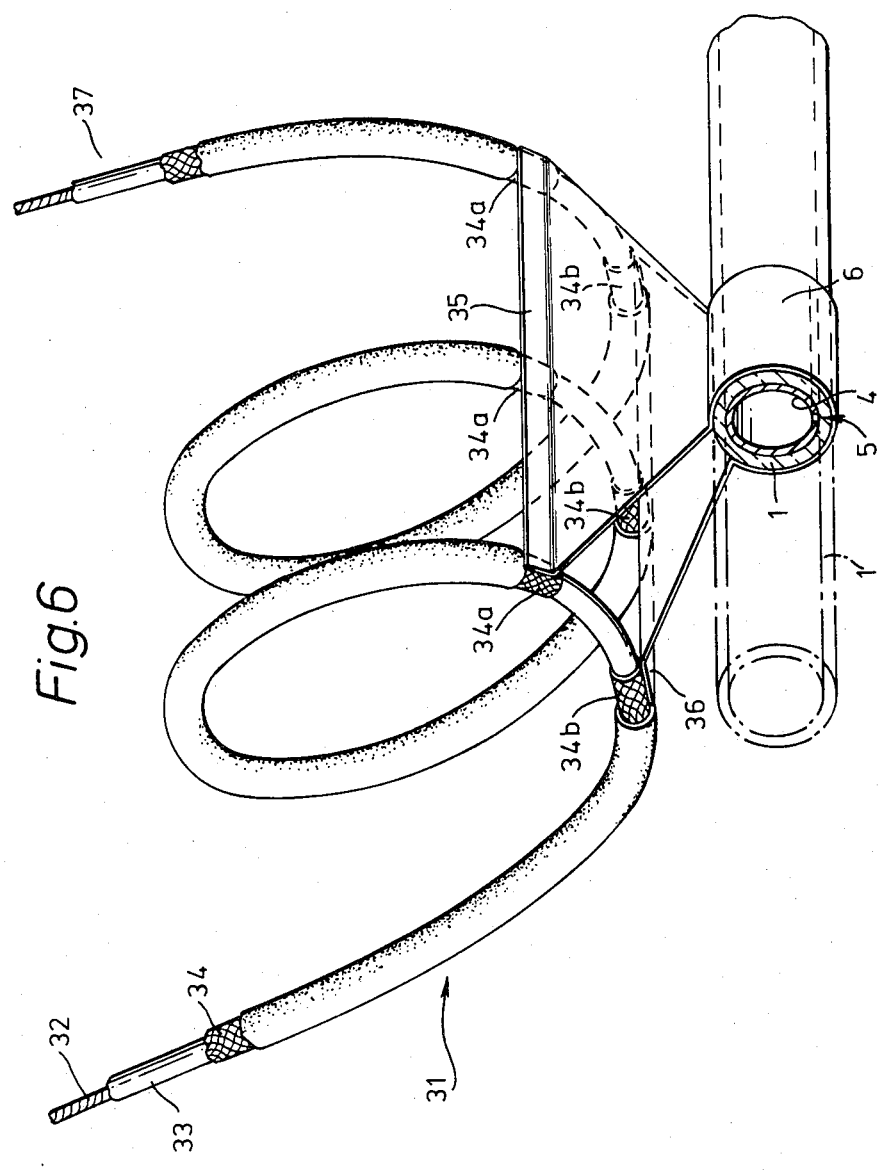
FIG. 6 is a partly schematic perspective view of an inductor and of a coaxial-cable transformer drawn to a larger scale.

The laser shown in FIGS. 2 and 3 includes a tube 1 which may be made of glass or other electrically insulating material. For reasons which will become apparent hereinafter it is not necessary to utilize a highly heat-resistant material. A particular embodiment was constructed with walls 2 mm thick and a 27-mm bore and with a length of 500 mm. The ends of the tube are secured to metallic adaptors 2 holding quartz windows 3 in position. The adaptors provide connections for the introduction of a buffer gas. Arranged inside the tube are five cylindrical copper-foil rings 4. (FIGS. 3,6). There may be any number of such rings, which constitute copper sources. An embodiment was constructed with sixteen such rings. Each ring is formed with a gap 5 in its circumference. As will become apparent, the metal may be selected from among such elements as, for example barium, magnesium, manganese, lead or indium. It is also possible to utilize different metals in the same laser which can be of advantage in producing white light.

Clamped to the outside of the tube are five inductors 6 which, to suit the dimensions of the tube given above, are e.g. of 33-mm bore diameter and 40-mm width and are spaced apart at 80-mm intervals, so that the inductor surface is in close proximity to the rings 4.

The inductors are connected to the secondary windings 7 of a step-down coaxial cable transformer more fully illustrated in FIG. 6. The primary winding 8 of the transformer is connected to a spark gap 9 whose other terminal is connected to a 0.7-$\mu$F discharge capacitor 10, rated at 50 kV, and to a power supply P. The adaptors 2 are connected via another spark gap 11 to a 0.1-$\mu$F, 50 kV discharge capacitor 12. The spark gaps 9 and 11 are sequentially triggered by pulses fed from a high-voltage double pulser (not shown). This is a commerical device readily obtainable which makes it possible to vary the duration of and the time delay between the two pulses. The time delay may be e.g. from 40 to 1000 $\mu$secs. A power supply P' of e.g. 20 kV feeds capacitor 12.

The device of FIG. 2 operates in the following manner.

The tube is filled with a buffer gas, for example helium at 4 to 20 Torr. Relatively high pressures (by laser standards) are preferred since this leads to a slower migration of the atoms across the cross-section of the tube and more efficient quenching. During the discharge of capacitor 10 a sufficient e.m.f. is induced in the copper rings to produce what can be loosely described as arcing. However, it is not necessary for this purpose that an arc be actually struck by closing the gap surfaces. Furthermore, a certain latitude in the gap is tolerable. In practice no perceptive gap is present at the outset. The edge surfaces are allowed to close, e.g. under the weight of the foil within the tube. The edge surfaces are noramlly sufficiently irregular that contact is made only at points which are subsequently vaporized. The presence of the buffer gas will in any case suffice to initiate the flow of electric current across any gap and a microplasma is produced containing vaporized copper, after breakdown of the buffer gas in the gap. The microplasma serves as a source of copper atoms and these diffuse toward the tube center, assisted by the magnetic field which is produced by the inductors 6. The substantial filling of the region of the tube enclosed by the copper ring is virtually immediate upon the generation of the pulse which may be relatively long, e.g. 200 nsecs., compared with what is known in the art (see Russell et al [5] where pulses of 20 nsecs. are described and where pulses of 250 nsecs. were achieved with great difficulty. To prolong the pulsing, a succession of very brief pulses of e.g. 10 nsecs. may be used. After a brief interval, e.g. of 60 to 300 $\mu$secs. the capacitor 12 is discharged by the double pulser via the adapters 2 and the ionized atmosphere within tube 1 which produces a glow discharge in the buffer gas in the tube. This leads to a simultaneous excitation of the copper atoms at all the sites. The excited copper atoms generate coherent light.

Figure 7:
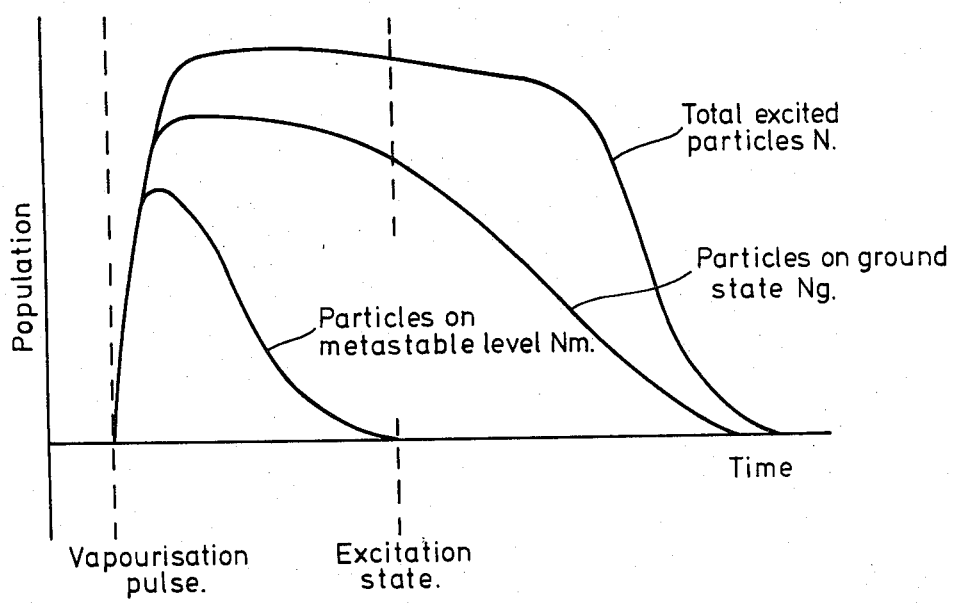
FIG. 7 is a graph illustrating the preferred timing of the vaporization and excitation pulses.

A shown in FIG. 7, although the vaporization pulses can be relatively long, leading to a high total population of particles, the population of atoms (or other particles) excited by the vaporization pulse to a metastable energy level Nm drops under the quenching action of the buffer gas so that the population at the ground state Ng is maintained for a longer period. It is possible by using the double-pulse technique described to excite the vapor after the population at the metastable level has dropped, and by appropriate timing while the population at the ground state is high. In this way it becomes possible to stimulate elements such as indium where normally the high inherent population in the relatively low-energy metastable state prohibits laser action.

Mirrors have not been shown in FIG. 2 and may be adopted as usual, together if desired with Brewster windows. However, I have found it possible in the laser described to produce, using appropriate elements, super-radiant coherent light where the amplification is sufficient without the necessity of mirrors to produce a laser beam.

The inductors 6 and transformer 7, 8 are shown more specifically in FIG. 6. As shown, a coaxial cable 31 is stripped at its ends to expose its core 32, a central insulating sleeve 33 and an outer conductive braid 34. The braid is cut at aligned positions on the three coils shown to expose bare ends. Three aligned ends 34a are connected, e.g. by soldering, to one terminal 35 of the inductor 6 which as shown is formed from a single loop of copper foil. The other aligned ends 34b of braid 34 are similarly connected to its other terminal 36. One end of the coaxial cable is short-circulated as shown at 37 and its other end is connected to the condenser 10 and spark gap 9 of FIG. 2. In this way the central conductor 32 forms the primary of an autotransformer, the turns of braid providing the secondary. In this coaxial-cable transformer the magnetic fields are confined within the cable so that no further precautions are necessary with respect to any external field. In an alternative arrangement the laser tube and the inductors 6 may be coaxially disposed within the turns of the coaxial transformers.

Figure 5:
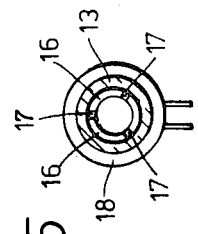
FIG. 5 is a transverse cross-section along the line V—V of FIG. 4.
Figure 4:
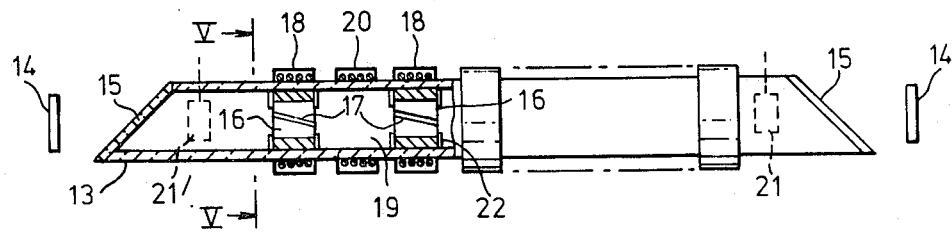
FIG. 4 is a schematic side view, partly in axial cross-section, of a modified laser according to the invention.

The same type of inductor is also used in the embodiment of FIGS. 4 and 5 which will now be described. In these Figures, the components may be similar to those of FIG. 2 unless otherwise described. A tube 13 is provided at each end with a Brewster window 15 and an external mirror 14, although both elements are optional as will become apparent. The source electrodes 16 are again rings, as in FIG. 2 but these are each shown divided into three separate or discrete arcuate sections with gaps 17 between them. As described with reference to gaps 5 of FIG. 3, the gaps 17 need not be formed initially but rather the segments may be sprung together under their own resilience. For this purpose the gaps shown in cross-section in FIG. 5, may be formed obliquely along the cylinder to increase the mutual support between the sections as indicated in FIG. 4. The vaporization inductors 18 are shown in this case as having four turns each, rather than a single turn, but may be identical to those of FIG. 2. Teflon rings 22 help confine the metal vapor and support the electrodes 16. These rings may alternatively be of glass or ceramic material, for example.

In spaces 19 between the inductors 18, excitation inductors 20 are located outside the tube. These may be identical or generally similar to the inductors 18.

If desired, excitation electrodes 21, 21' with electric leads out of the tube may be provided instead of the external excitation inductors 20, as indicated in dotted lines in FIG. 4. For reasons already explained, however, I prefer to avoid the need for conductors penetrating the peripheral tube wall.

I have found it possible by arranging an inductor outside the tube as shown at 20 to induce, by means of current pulse in the inductor, a rapidly changing electromagnetic field in the gas near the inner surface of the tube which breaks down the gas, resulting in a glow discharge. The conditions necessary to produce this effect are derived from those utilized in plasma physics for obtaining the $\theta$ pinch effect in ionized plasma. Generally speaking, steep pulses with a high rate of change of current, e.g. of the order of $10^{11}$ amps per second, are utilized. Pinching of the gas in the laser tube does not occur, however, on account of generally lower pressures prevailing in lasers. In practice the glow discharge extends throughout the cross-section of the tube in the vicinity of the inductor.

The inductors 20 may be arranged to operate simultaneously, very shortly after the simultaneous energization of the vaporization inductors 18, to follow the procedure described with reference to FIG. 2. For this purpose a second coaxial-cable transformer or series of transformers may be employed. The power supply may be for example 20 kV as in the case of FIG. 2 or 35 kV and a similar capacitor may be utilized as in the vaporization circuit of FIG. 2.

Moreover the provision of the distributed excitation sites, made possible by the localized vaporization and excitation, enables excitation at the wavefront of a traveling wave. This "traveling wave" effect has been produced by the use of distributed transverse excitation electrodes (Shipman [4]). This is achieved by excitation at a pair of sites so that the excitation pulse at the second site coincides with the arrival at that site of the propagated light beam from the first site. As described in Petrash [6] in this system the signal starting at one end of the action zone is propagated therealong and continuously amplified at moments near the instants of maximum inversion. The light propagated in the opposite direction is amplified considerably less (e.g. 10 times less in the case of nitrogen). This technique is extremely important to get high power when using elements with a short inversion lifetime, thanks to the fact that it allows a long active zone to be used [4].

In order to achieve the delay between excitation at one site and excitation at the next downstream site, the path of the current to the second site may be increased effectively by the distance between the sites along the beam axis. If desired, account may be taken of the difference between the speed of light in a vacuum current in a copper conductor and electromagnetic waves in specified dielectrics, but in practice, with the short distances involved, this difference may be insignificant. The difference in the electron-current paths may in turn be achieved simply by suitably staggering the lengths of the coaxial connectors extending from the discharge condenser to the several sites. The "connectors" in this case may include the actual inductor or transformer, which in practice is formed at the end of a coaxial-cable lead.

According to a further modification, the energy supplied at each excitation site in the downstream direction of the beam may be altered, preferably with progressive augmentation. This further enchances the phenomenon, caused by the traveling wave, that the beam tends to diverge less than would otherwise be the case with a super-radiant beam produced without the aid of mirrors. Thus in practice the number of turns (or fractional turns) in each inductor may be progressively increased in the downstream direction in order to achieve both effects. Alternatively it is possible to insert condensers of different capacitance in the circuits leading to the several excitation inductors.

It will be evident that a series of individual coaxial-cable transformers is normally used for the excitation inductors 20 of FIG. 4. In theory a single primary may be used in the embodiment of FIGS. 2 and 4 for the vaporization inductors 6, 18. In practice these are formed individually as illustrated in FIG. 6.

The following Example 1 illustrates an application of the embodiment of FIG. 2.

EXAMPLE 1

The type of laser in this example has already been described with reference to FIG. 2, helium being the buffer gas and copper the metal. The laser pulse was detected by an FD125 (M20) photodiode (Instrument Technology Limited) and displayed on a 519 Tektronix Oscilloscope.

The radiant power was roughly estimated at about 80 kW under the following conditions:

| laser-pulse duration | 10 nsecs. |
|---|---|
| first-capacitor charge voltage | 38 k v |
| second-capacitor charge voltage | 25 k v |
| exciting-pulse time delay | 60–300 $\mu$secs. |
| buffer-gas pressure | 6 Torr. |

It will be apparent from the description of the embodiment of FIG. 4 that the electromagnetically induced discharge can be utilized in a gas or chemical laser in which no vaporized metal is utilized. The following is an example of the utilization of the induced glow discharge in a gas laser.

EXAMPLE 2

The laser consisted of a cylindrical thin-walled (2 mm thick) glass tube 500 mm long with a 27-mm bore. Fixed on both ends of the tube, with the aid of adaptors, were germanium mirrors one of which was a full reflector while the other had a 98% reflectance. Clamped to the glass tube were five copper inductors of 33-mm bore, and each of width 40 mm, spaced at 40-mm intervals.

The inductors served as loads for secondary windings of a step-down coaxial-cable transformer of the type already described with reference to FIG. 6, the power supply and capacitor being as illustrated in FIG. 2 except that no end electrodes 2 and associated circuit elements 11, 12 are used. Copper rings 4 are, of course, also omitted. A gas consisting of $CO_2$ alone or in admixture with $N_2$ and/or He in different ratios was fed through the adaptors which as shown in FIG. 2 had inlets and outlets to enable such gas at low pressure to be passed through the tube continuously, although such continuous passage is not necessary in metal-vapor lasers. The overall gas pressure did not exceed 50 Torr. Coherent radiation ($\lambda = 10.6\ \mu$) characteristic of $CO_2$ lasers was observed during capacitor discharge. The laser radiation was detected by a Ge-Au SBRC detector and displayed by a Tektronix 564 B oscilloscope.

The radiation-pulse duration at the 0.9 level varied from 50 to 1000 $\mu$sec. depending on the mixture used. The minimum duration corresponded to pure $CO_2$, the duration of the current pulse being a constant 20 $\mu$sec.

It will be apparent that many modifications may be made in the apparatus described and that features from one embodiment may be utilized in connection with any other embodiment. As to the construction of the vapor-source electrodes, this can be done in a number of different ways. For example, vapour can, if necessary, be deposited on the interior of the tube in appropriate places. Heavier bodies can be utilized and held in place with appropriate gaps if necessary and supported by resilient inert members within the tube. The vapourisation electrodes may be in the form of porous inert blocks, for example cylindrical members of porous glass, in whose pores there is deposited a solid source material as a film or powder so that a latticework of disconnected surfaces is provided. It is possible by utilizing such an arrangement to continuously feed in a metal from the exterior of the tube through the porous glass, so that the laser can be maintained operating for long periods if necessary.

Figure 8:
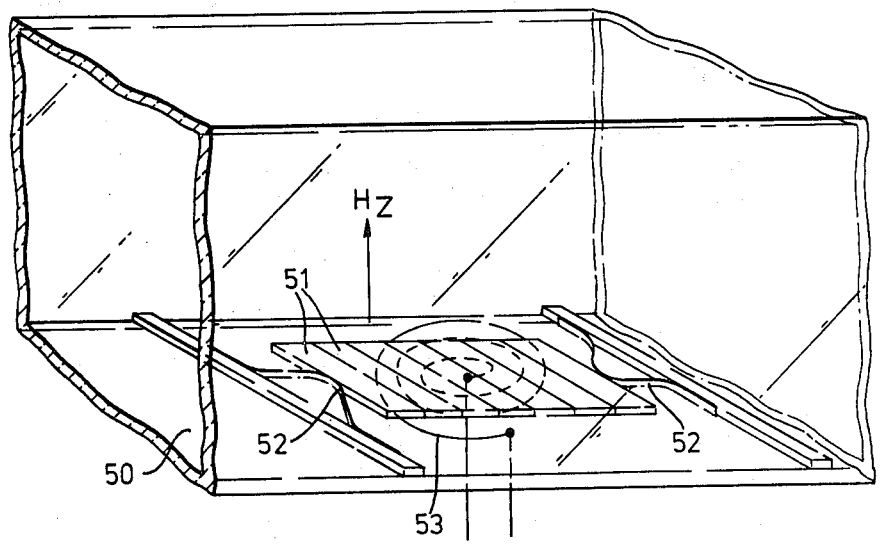
FIG. 8 is a schematic view of an embodiment in which a transverse magnetic field is utilized.

A transverse magnetic field may be used for vaporization or induction. FIG. 8 shows diagrammatically a vaporization site in a laser vessel which may be of any desired shape, e.g. a rectangular prism. On the inside, e.g. against one wall 50, a series of strips 51 of source material are held in contact by resilient means 52. On the outside of the wall an induction coil 53 generates a magnetic field $H_z$ normal to the plane of the strips.

As already stated electrodes with connectors passing through the wall of the tube may be used in certain instances, yet I prefer to avoid such an arrangement in order that the tube may be cheaply fabricated and readily replaced.

The construction of the laser with a traveling wave permits a lowering of the divergence of radiation which is indigenous in super-radiation produced from high-yield metal such as copper and lead.

It is of course possible to utilize transverse electrodes as employed e.g. by Shipman [4] to produce a traveling wave, in combination with metal-vapor generation as described. It may also utilize a single continuous induction coil to generate metal vapor at different locations in the tube. Again, in connection with an induced glow discharge as described above, one could employ other forms of metal-vapor generation e.g. by electric discharges in appropriate positions utilizing connectors which pass through the tubes where required and internal connections if desired. The vaporization electrodes, where induction is utilized, may consist of woven copper wire which may form complete rings. This will lead to an arc-type discharge as described. However, if desired, electrodes in the form of complete rings may be simply vaporized by induction to produce the metal vapor. Induction may in particular be utilized to vaporize a deposited metal coating on the tube, either throughout the tube or at localized regions. In the preferred case the tube is cooled in a localized vaporization zone, e.g. with liquid nitrogen. In this way the metal is redeposited at the vaporization site (and not dispersed) between the vaporization pulses.

The following advantages are derived from the method of vapor generation at spaced-apart locations in accordance with my present invention:

(a) Immediate vaporization takes place, and this in turn allows precise timing thereof with respect to other operations.

(b) It is possible to produce vapour in tubes which are made of inexpensive materials and which are easily replaced.

(c) It is possible to vaporize metals with high boiling points.

(d) Metal vapors of practically unlimited density may be obtained.

(e) By limiting vaporization to the tube I am able to protect the windows from condensation of vapor.

(f) Since introduction of the electrodes is simple, the tube life can be extended.

(g) Chemical reactions are possible between materials of different types.

(h) It is possible to use various materials at different places, e.g. two or more metals, which can be utilized to produce white light, or composite light of different selected wavelengths for use e.g. in spectroscopy.

The advantages of using induction to vaporize the metal or other source materials include the following:

(a) There are no wires projecting through the glass so that the tube is easy to replace and simple to manufacture.

(b) The magnetic field can be used to excite the buffer gas and also to concentrate the vaporize material in the central region of the tube.

(c) As a result of this centralization there is no heating of the tube and ordinary glass can be used in its construction.

(d) By modifying the parameters of the magnetic field it becomes possible to change the speed of injection of the source atoms and thus the duration of the pulse.

Advantages arising from the induced breakdown of the gas include the following:

(a) The sides of the glass are automatically cleaned of source material during a pulse.

(b) There are, again, no connections through the glass.

(c) No electrodes are needed. This not only allows cheap tube construction as already mentioned but avoids the possibility of introducing extraneous matter into the tube via the leads.

(d) It is possible to use gases which are reactive as in Excimer lasers.

(e) I may use a broader range of buffer gases which are of course selected for their combined effect of collision excitation with the metal atoms and for their utility in quenching, i.e. reducing the population at the metastable level.

A major advantage arising out of the method of laser stimulation using the double-pulse principle is the fact that time is allowed to drop the population at the metastable level (arising from vaporization) before excitation.

TABLE I

Experimental data of the generation of the transition from resonance to metastable levels in metal atoms. [6]

| λ A | Atom | Transition | $\eta_{lim}$ (%) | T °C. |
|---|---|---|---|---|
| 3639 | PbI | $6p7^3P_1^o \to 6p^2\ ^3P_1$ | 39 | 1000 |
| 4057 | PbI | $6p7^3P_1^o \to 6p^2\ ^3P_2$ | 44 | 1000 |
| 4062 | PbI | $6p6d^3D_1^o \to 6p^2\ ^1D_2$ | 33 | 1000 |
| 5105 | CuI | $4p^2P_{3/2}^o \to 4s^2\ ^2D_{5/2}$ | 38 | 1500 |
| 5341 | MnI | $y^6P_{7/2}^o \to a^6D_{9/2}$ | 29 | 1200 |
| 5350 | TlI | $7^2S_{\frac{1}{2}} \to 6^2P_{3/2}$ | 47 | 800 |
| 5420 | MnI | $y^6P_{5/2}^o \to a^6D_{7/2}$ | 30 | 1200 |
| 5470 | MnI | $y^6P_{5/2}^o \to a^6D_{5/2}$ | 25 | 1200 |
| 5517 | MnI | $y^6P_{3/2}^o \to a^6D_{3/2}$ | 25 | 1200 |
| 5538 | MnI | $y^6P_{3/2}^o \to a^6D_{\frac{1}{2}}$ | 17 | 1200 |
| 5782 | CuI | $4p^2P_{\frac{1}{2}}^o \to 4S^2\ ^2D_{3/2}$ | 38 | 1500 |
| 6278 | AuI | $6p^2P_{\frac{1}{2}}^o \to 6s^2\ ^2D_{3/2}$ | 29 | 1500 |
| 7229 | PbI | $6p7^3P_1^o \to 6p^2\ ^1D_2$ | 24 | 1000 |
| 12900 | MnI | $z^6P_{7/2}^o \to a^6D_{9/2}$ | 14 | 1200 |
| 13294 | MnI | $z^6P_{7/2}^o \to a^6D_{7/2}$ | 15 | 1200 |
| 13319 | MnI | $z^6P_{5/2}^o \to a^6D_{7/2}$ | 17 | 1200 |
| 13627 | MnI | $z^6P_{5/2}^o \to a^6D_{5/2}$ | 15 | 1200 |
| 13864 | MnI | $z^6P_{3/2}^o \to a^6D_{\frac{1}{2}}$ | 14 | 1200 |
| 55460 | CaI | $4p^1p_1^o \to 3d^1D_2$ | 4.8 | 600 |
| 64560 | SrI | $5p_1^o \to d^1D_2$ | 4.5 | 500 | where, λ = wavelength of generation $$\eta_{lim} = \frac{E_r - E_m}{E_r} \cdot \frac{g_m}{g_m + g_r} \%$$

T = temperature of metal vapor

TABLE II

Theoretical data of the generation of the transition from resonance to metastable levels in metal atoms.

| 1 Atom | 2 Transition | 3 λ,A | 4 $\eta_{lim}$ (%) | 5 τ (nsec) | 6 T(°C.) (0.1 torr) |
|---|---|---|---|---|---|
| SnI | $6S^3P_1^o \to 5p^2\ ^1S_o$ | 5631.71 | 13 | 700 | 1590 |
| | $6S^1P_1^o \to 5p^2\ ^1S_o$ | 4524.74 | 16 | 25 | |
| | $6S^3P_1^o \to 5p^2\ ^1D_2$ | 2801.02 | 47 | 15 | |
| | $6S^1P_1^o \to 5p^2\ ^1D_2$ | 3262.34 | 49 | 2.5 | |
| AuI | $6p^2P_{3/2}^o \to 6S^2\ ^2D_{5/2}$ | 3122.78 | 47 | 20 | 1750 |
| BiI | $7S^4P_{\frac{3}{2}}^o \to 6p^3\ ^2D_{3/2}^o$ | 4722.19 | 43 | 110 | 880 |
| CoI | $x^4D_{7/2}^o \to b^4P_{5/2}$ | 4086.31 | 26 | 36 | 1890 |
| PtI | $6S^1D_3 \to 6S^1D_4$ | 6326.58 | 33 | | 2540 |
| | $6S^1D_3 \to 6S^1D_2$ | 5044.04 | 24 | | |
| | $6S^1D_4 \to 5d^{10}\ ^1S_3$ | 3323.80 | 39 | | |
| MoI | $y^7P_3^o \to a^5D_4$ | 5210.44 | 34 | | 3070 |
| | $z^7D_2^o \to a^5S_2$ | 4903.81 | 33 | | |
| | $z^7P_2^o \to a^5S_2$ | 4869.20 | 35 | | |
| ZrI | $u^3D_1^o \to b^3F_2$ | 4576.20 | 30 | | 2950 |
| W I | $z^5P_1^o \to a^5G_2$ | 4745.57 | 26 | | 3870 |

τ = duration of radiation pulse (nsec)

SCHEDULE

[1] R. S. Anderson, B. G. Bricks, T. W. Karras and L. W. Springer, "Discharge-Heated Lead Vapor Laser", I.E.E.E. Journal of Quantum Electronics, May 1976, page 313.

[2] Walter W. Rice and Reed J. Jenson "Aluminum Fluoride Exploding-Wire Laser", Applied Physics Letters, Vol. 22, No. 2, Jan. 15, 1973, page 67.

[3] A. M. Shukhtin, G. A. Fedotov and V. G. Mishakov, "Stimulated Emission on Copper Lines During Pulse Production of Vapor Without the Use of a Heating Element" Opt.Spectrosk, Vol. 40, No. 2, Feb. 1976, page 237.

[4] J. D. Shipman, Jr., Applied Physics Letters, Vol. 10 No. 1, January 1, 1967, Page 3.

[5] G. R. Russell, N. M. Nerheim and T. J. Pivirotto "Supersonic Electrical-Discharge Copper Vapor Laser," Applied Physics Letters Vol. 21, No. 12, Dec. 15, 1972, page 565.

[6] G. G. Petrash, "Pulsed Gas-Discharge Lasers", Soviet Physics Uspekhi, Vol. 14, No. 6, May-June 1972, pages 747–765.

I claim:

1. A method of stimulating the emission of light in a laser, comprising the steps of:
    disposing a plurality of solid electrically conductive bodies, each consisting at least in part of a vaporizable substance whose vapors are excitable to a radiation-emissive level, at spaced-apart sites in a substantially closed vessel of dielectric material;
    simultaneously generating an electric current pulse by electromagnetic induction through the wall of said vessel in each of said bodies for vaporizing at least part of said substance; and
    exciting the resulting vapors to the radiation-emissive level by subjecting said vapors to a high-intensity electric field.

2. A method as defined in claim 1 wherein said substance is a metal.

3. A method as defined in claim 2 wherein the metal is copper, lead or gold.

4. A method as defined in claim 2 wherein the metal is indium.

5. A method as defined in claim 1 or 2 wherein the electromagnetically induced vaporization pulse is followed by an excitation pulse generating said high-intensity field.

6. A method as defined in claim 5 wherein said vessel is an elongate tube, said excitation pulse being applied across two electrodes located at opposite ends of said tube.

7. A method as defined in claim 5 wherein said vessel is an elongate tube centered on an axis and said sites are spaced along said axis, said excitation pulse being inductively generated at intermediate axial locations between successive sites.

8. A method as defined in claim 1 or 2 wherein said vessel is filled with a buffer gas prior to vaporization of said solid material.

9. A method as defined in claim 8 wherein said buffer gas is maintained at a pressure between substantially 4 and 20 Torr.

10. A method as defined in claim 5 wherein said excitation pulse follows said vaporization pulse with a delay sufficient for substantially complete quenching of vapor particles at a metastable energy level by a buffer gas present in said vessel.

11. A method as defined in claim 8 wherein said excitation pulse is electromagnetically induced in the buffer gas for excitation of said vapors from outside said vessel.

12. A method as defined in claim 1 or 2, comprising the further step of cooling said vessel in the vicinity of said sites for redepositing said substance on an inner wall surface thereof.

13. A laser comprising:
a substantially closed generally cylindrical tube of dielectric material;
a plurality of solid electrically conductive bodies disposed at axially spaced-apart sites in said tube, each of said bodies consisting at least in part of a vaporizable substance whose vapors are excitable to a radiation-emissive energy level;
first current-supply means including a plurality of vaporization inductors looped around said tube at axially spaced locations respectively corresponding to said sites in substantial registry with said bodies for electromagnetically energizing same with a current vaporizing at least part of said substance; and
second current-supply means operable in timed relationship with said first current-supply means for exciting the resulting vapors in said tube to the radiation-emissive level by subjecting said vapors to a high-intensity field.

14. A laser as defined in claim 13 wherein said substance is a metal.

15. A laser as defined in claim 14 wherein said metal is copper, lead or gold.

16. A laser as defined in claim 14 wherein said metal is indium.

17. A laser as defined in claim 13 or 14 wherein said first and second current-supply means each comprises a capacitor in series with a spark gap.

18. A laser as defined in claim 13 or 14 wherein said bodies are rings lining an inner wall surface of said tube.

19. A laser as defined in claim 18 wherein said tube is filled with a buffer gas.

20. A laser as defined in claim 19 wherein said gas is under a pressure between substantially 4 and 20 Torr.

21. A laser as defined in claim 19 wherein each of said rings is slitted with at least one narrow, generally transverse gap giving rise to arcing thereacross upon electromagnetic energization of said rings by the respective inductors.

22. A laser as defined in claim 21 wherein said gap extends obliquely to the tube axis.

23. A laser as defined in claim 13 or 14 wherein said first current-supply means further comprises coaxial-cable transformer means having secondary winding means in series with said vaporization inductors.

24. A laser as defined in claim 13 or 14 wherein said second current-supply means further comprises a plurality of excitation inductors looped around said tube at axially spaced locations between said vaporization inductors.

25. A laser as defined in claim 13 or 14 wherein said second current-supply means further comprises a pair of end electrodes on said tube connected across the associated capacitor and spark gap.

26. A laser as defined in claim 13 or 14 wherein said bodies are inert porous structures having said substance lodged in the pores thereof.

27. A laser as defined in claim 13 or 14 wherein said vessel tube is provided with an exit end for radiant light produced therein, said locations following one another along a line terminating at said exit end, said pulse-generating means being linked to said inductors by connections energizing said inductors with progressive delays substantially corresponding to the transit time of light along said line toward said exit end.

28. A laser as defined in claim 27 wherein said connections are arranged to increase the intensity of said electric field from one location to the next in the direction of said exit end.

29. A laser comprising:
a substantially closed vessel having a substantially cylindrical wall of dielectric material;
a vaporizable substance whose vapors are excitable to a radiation-emissive energy level in said vessel, said substance lining an inner surface of said wall;
electromagnetic induction means outside said vessel but in close proximity thereof, said induction means forming a loop hugging an outer surface of said wall opposite said substance;
pulse-generating means connected to said induction means for inducing a current flow in said substance to vaporize at least part thereof; and
circuit means correlated with said said pulse-generating means for exciting the resulting vapors to said radiation-emissive level.

30. A laser comprising:
a substantially closed vessel of dielectric material filled with a buffer gas;
electromagnetic induction means outside said vessel but in close proximity thereof, said induction means having an axis within said vessel;
a conductive body of substantially closed configuration in said vessel centered on said axis and provided with at least one narrow generally transverse gap, said body including a vaporizable substance whose vapors are excitable to a radiation-emissive energy level in said vessel;
pulse-generating means connected to said induction means for inducing a current flow in said body to vaporize at least part of said substance, said buffer gas giving rise to arcing across said gap upon energization of said induction means by said pulse-generating means; and
circuit means correlated with said pulse-generating means for exciting the resulting vapors to said radiation-emissive level.

31. A laser as defined in claim 30 wherein said body is metallic and is disposed at a localized site in said vessel.

32. A laser as defined in claim 30 or 31 wherein said vessel has a substantially flat wall, said substance being situated on an inner surface of said wall, said induction means comprising a coil on an outer surface of said wall having an axis substantially perpendicular thereto.

33. A laser as defined in claim 30 or 31 wherein said vessel has a substantially cylindrical wall, said substance lining an inner surface of said wall, said induction means comprising a loop hugging an outer surface of said wall opposite said substance.

* * * * *